United States Patent [19]

Cretin-Maitenaz

[11] 3,785,724

[45] Jan. 15, 1974

[54] OPHTHALMIC LENSES WITH PROGRESSIVELY VARYING FOCAL LENGTH

[75] Inventor: Bernard Cretin-Maitenaz, Joinville-le-Pont, France

[73] Assignee: Essilor International (Compagnie Generale d'Optique), Paris, France

[22] Filed: June 15, 1972

[21] Appl. No.: 263,100

Related U.S. Application Data

[63] Continuation-in-part of Ser. No. 19,772, March 16, 1970, abandoned, which is a continuation-in-part of Ser. No. 683,865, Nov. 17, 1967, abandoned.

[30] Foreign Application Priority Data

Nov. 29, 1966  France ............................. 6685403

[52] U.S. Cl. ................................. 351/169, 351/177
[51] Int. Cl. .............................................. G02c 7/06
[58] Field of Search ............................ 351/169, 177

[56] References Cited
UNITED STATES PATENTS

| | | | |
|---|---|---|---|
| 2,915,856 | 12/1959 | Maitenaz | 351/177 X |
| 2,869,422 | 1/1959 | Maitenaz | 351/169 |
| 2,878,721 | 3/1959 | Kanolt | 351/169 |
| 2,982,058 | 5/1961 | Maitenaz | 51/124 L |
| 3,021,647 | 2/1962 | Maitenaz | 51/55 |
| 3,041,789 | 7/1962 | Maitenaz | 351/177 X |

*Primary Examiner*—David H. Rubin
*Attorney*— Robert E. Burns and Emmanuel J. Lobato

[57] ABSTRACT

An improved ophthalmic lens with varying focal length, said lens being made of a refractive material and having two refractive surfaces one of which is divided into first, second and third substantially horizontally extending zones intended respectively for distant vision, intermediate distance vision and near vision, said one surface having an oblique meridian passing through the optical center of the lens and traversing said zones, said meridian being inclined downwardly from the temporal side of the lens toward the nasal side of the lens along an angled path traced by the line of sight of a wearer in going from distant vision to near vision, said first zone occupying approximately the upper half of said one surface and having a substantially constant curvature providing a substantially constant focal length for distant vision, said third zone occupying a lower portion of said one surface and having a substantially constant curvature providing a substantially constant focal length for near vision, and said second zone lying between said first and third zones and having a varying curvature providing a varying focal length, the curvature of said second zone at successive points along said meridian varying progressively from the substantially constant curvature of said first zone to the substantially constant curvature of said third zone, said second zone having at each point thereof a minimum curvature $C_{min.}$ and a maximum curvature $C_{max.}$ except along said meridian where the minimum and maximum curvatures at each point thereof are of equal value, said second zone further having on one side of said meridian a first line which is a loci of points where $C_{min.}$ and $C_{max.}$ satisfy the following relation: $[C_{max.}-C_{min.}] = N$, where $N$ has a given value which satisfies the relation: $N \leq 1/(n-1)$, $n$ being the refractive index of said refractive material, and on the other side of said meridian a second line which is a loci of points where $C_{min.}$ and $C_{max.}$ satisfy the above-mentioned relation, the improvement consisting in that, when the lens is in use, any horizontal line in said second zone intersects successively said first line, said meridian and said second line at respective points of intersection, the point of intersection of said horizontal line with said meridian being substantially equally spaced from the points of intersection of said horizontal line with said first and second lines.

2 Claims, 11 Drawing Figures

| 19°6 | 16°8 | 14° | 11°2 | 8°4 | 5°6 | 2°8 | 0° | Vx |
|---|---|---|---|---|---|---|---|---|
| | | | 0.0409 | 0.0323 | 0.0291 | 0.0287 | 0.0287 | 19°6 |
| | | 0.0532 | 0.0364 | 0.0278 | 0.0247 | 0.0242 | 0.0242 | 16°8 |
| | 0.0764 | 0.0488 | 0.0321 | 0.0235 | 0.0203 | 0.0199 | 0.0199 | 14° |
| 0.1130 | 0.0719 | 0.0442 | 0.0275 | 0.0189 | 0.0158 | 0.0153 | 0.0153 | 11°2 |
| 0.1087 | 0.0675 | 0.0399 | 0.0232 | 0.0146 | 0.0114 | 0.0110 | 0.0110 | 8°4 |
| 0.1039 | 0.0627 | 0.0352 | 0.0185 | 0.0100 | 0.0068 | 0.0064 | 0.0064 | 5°6 |
| 0.1116 | 0.0698 | 0.0408 | 0.0219 | 0.0108 | 0.0051 | 0.0029 | 0.0022 | 2°8 |
| 0.1455 | 0.1020 | 0.0681 | 0.0424 | 0.0236 | 0.0107 | 0.0029 | 0.0000 | 0° |
| 0.2090 | 0.1628 | 0.1211 | 0.0842 | 0.0528 | 0.0280 | 0.0111 | 0.0046 | 2°8 |
| 0.3088 | 0.2585 | 0.2067 | 0.1550 | 0.1062 | 0.0646 | 0.0350 | 0.0235 | 5°6 |
| 0.4534 | 0.3988 | 0.3344 | 0.2640 | 0.1934 | 0.1308 | 0.0850 | 0.0671 | 8°4 |
| 0.6536 | 0.5939 | 0.5153 | 0.4233 | 0.3272 | 0.2394 | 0.1742 | 0.1485 | 11°2 |
| | 0.8411 | 0.7494 | 0.6366 | 0.5154 | 0.4020 | 0.3171 | 0.2832 | 14° |
| | | 1.0310 | 0.9039 | 0.7636 | 0.6302 | 0.5285 | 0.4876 | 16°8 |
| | | | 1.2219 | 1.0747 | 0.9312 | 0.8203 | 0.7751 | 19°6 |

Fig. 7

| 19°6 | 16°8 | 14° | 11°2 | 8°4 | 5°6 | 2°8 | 0° | $V_X$ |
|------|------|-----|------|-----|-----|-----|----|-------|
|      |      |     | 0.25 | 0.18 | 0.08 | 0.00 | 0.00 | 19°6 |
|      |      | 0.34 | 0.27 | 0.17 | 0.08 | 0.02 | 0.00 | 16°8 |
|      | 0.46 | 0.37 | 0.29 | 0.20 | 0.12 | 0.02 | 0.00 | 14° |
| 0.50 | 0.42 | 0.34 | 0.27 | 0.18 | 0.08 | 0.02 | 0.00 | 11°2 |
| 0.53 | 0.46 | 0.37 | 0.28 | 0.20 | 0.12 | 0.02 | 0.00 | 8°4 |
| 0.10 | 0.04 | 0.02 | 0.05 | 0.03 | 0.02 | 0.02 | 0.00 | 5°6 |
| 0.37 | 0.45 | 0.47 | 0.43 | 0.39 | 0.35 | 0.18 | 0.00 | 2°8 |
| 0.65 | 0.74 | 0.73 | 0.80 | 0.80 | 0.64 | 0.39 | 0.00 | 0° |
| 1.08 | 1.20 | 1.19 | 1.24 | 1.20 | 0.98 | 0.60 | 0.00 | -2°8 |
| 1.59 | 1.71 | 1.72 | 1.62 | 1.62 | 1.31 | 0.78 | 0.00 | -5°6 |
| 2.29 | 2.42 | 2.43 | 2.16 | 2.07 | 1.71 | 1.01 | 0.00 | -8°4 |
| 2.42 | 2.56 | 2.61 | 2.44 | 2.28 | 1.94 | 1.15 | 0.00 | -11°2 |
|      | 2.48 | 2.62 | 2.55 | 2.27 | 1.89 | 1.13 | 0.00 | -14° |
|      |      | 2.37 | 2.37 | 2.19 | 1.75 | 0.92 | 0.00 | -16°8 |
|      |      |     | 2.06 | 1.88 | 1.56 | 0.83 | 0.00 | -19.6 |

$V_Y$ column shown at right; M, $M_1$ labels on matrix.

Fig. 9

| $V_Y$ \ $V_X$ | 0° | 2°8 | 5°6 | 8°4 | 11°2 | 14° | 16°8 | 19°6 |
|---|---|---|---|---|---|---|---|---|
| 19°6 | 0.00 | 0.00 | 0.08 | 0.18 | 0.25 | | | |
| 16°8 | 0.00 | 0.02 | 0.08 | 0.17 | 0.27 | 0.34 | | |
| 14° | 0.00 | 0.02 | 0.12 | 0.20 | 0.29 | 0.37 | 0.46 | |
| 11°2 | 0.00 | 0.02 | 0.08 | 0.18 | 0.27 | 0.34 | 0.42 | 0.50 |
| 8°4 | 0.00 | 0.02 | 0.12 | 0.20 | 0.28 | 0.37 | 0.46 | 0.53 |
| 5°6 | 0.00 | 0.01 | 0.01 | 0.01 | 0.04 | 0.05 | 0.16 | 0.22 |
| 2°8 | 0.00 | 0.16 | 0.33 | 0.28 | 0.29 | 0.26 | 0.17 | 0.06 |
| 0° | 0.00 | 0.37 | 0.54 | 0.64 | 0.52 | 0.39 | 0.30 | 0.09 |
| -2°8 | 0.00 | 0.57 | 0.83 | 0.95 | 0.89 | 0.69 | 0.51 | 0.24 |
| -5°6 | 0.00 | 0.72 | 1.14 | 1.32 | 1.23 | 1.05 | 0.73 | 0.22 |
| -8°4 | 0.00 | 0.98 | 1.52 | 1.83 | 1.78 | 1.57 | 1.18 | 0.25 |
| -11°2 | 0.00 | 1.12 | 1.92 | 2.26 | 2.04 | 1.73 | 0.97 | 0.55 |
| -14° | 0.00 | 1.28 | 2.27 | 2.50 | 2.45 | 2.06 | 1.30 | |
| -16°8 | 0.00 | 1.51 | 2.52 | 3.01 | 3.03 | 2.77 | | |
| -19°6 | 0.00 | 1.73 | 3.20 | 3.94 | 4.07 | | | |

Fig. 10

| $V_Y$ \ $V_X$ | 0° | 2.8 | 5.6 | 8.4 | 11.2 | 14° | 16.8 | 19.6 |
|---|---|---|---|---|---|---|---|---|
| 19.6 | 0.0287 | 0.0287 | 0.0291 | 0.0323 | 0.0409 | | | |
| 16.8 | 0.0242 | 0.0242 | 0.0247 | 0.0278 | 0.0364 | 0.0532 | | |
| 14° | 0.0199 | 0.0199 | 0.0203 | 0.0235 | 0.0321 | 0.0488 | 0.0764 | |
| 11.2 | 0.0153 | 0.0153 | 0.0158 | 0.0189 | 0.0275 | 0.0442 | 0.0719 | 0.1130 |
| 8.4 | 0.0110 | 0.0110 | 0.0114 | 0.0146 | 0.0232 | 0.0399 | 0.0675 | 0.1087 |
| 5.6 | 0.0064 | 0.0064 | 0.0068 | 0.0100 | 0.0182 | 0.0349 | 0.0621 | 0.1033 |
| 2.8 | 0.0022 | 0.0029 | 0.0048 | 0.0099 | 0.0201 | 0.0378 | 0.0653 | 0.1065 |
| 0° | 0.0000 | 0.0029 | 0.0098 | 0.0206 | 0.0361 | 0.0576 | 0.0873 | 0.1284 |
| −2.8 | 0.0046 | 0.0108 | 0.0259 | 0.0459 | 0.0695 | 0.0962 | 0.1280 | 0.1688 |
| −5.6 | 0.0235 | 0.0344 | 0.0604 | 0.0927 | 0.1262 | 0.1581 | 0.1901 | 0.2302 |
| −8.4 | 0.0671 | 0.0841 | 0.1236 | 0.1700 | 0.2142 | 0.2501 | 0.2809 | 0.3175 |
| −11.2 | 0.1485 | 0.1727 | 0.2277 | 0.2903 | 0.3441 | 0.3815 | 0.4067 | 0.4379 |
| −14° | 0.2832 | 0.3150 | 0.3846 | 0.4605 | 0.5187 | 0.5499 | 0.5615 | |
| −16.8 | 0.4876 | 0.5255 | 0.6056 | 0.6853 | 0.7359 | 0.7469 | | |
| −19.6 | 0.7751 | 0.8161 | 0.8973 | 0.9673 | 0.9915 | | | |

OPHTHALMIC LENSES WITH PROGRESSIVELY VARYING FOCAL LENGTH

This application is a continuation in part application of the now-abandoned patent application Ser. No. 19,772 filed Mar. 16, 1970, which in turn is a continuation in part of now-abandoned application Ser. No. 683,865 filed Nov. 17, 1967. 1. Field of the Invention The present invention relates to ophthalmic lenses with progressively varying focal length.

2. Prior Art

In the U.S. Pat. No. 2,869,422, the applicants have disclosed an ophthalmic lens with a progressively varying focal length capable of compensating for the lack of, or reduction in, the ability of the human eye to change its effective focal length in order to see objects distinctly at varying distances, this lack of, or reduction in, the physiological accomodation being caused for example by age in the case of long-sighted persons. Such known ophthalmic lens generally has two refractive surfaces, one of which is divided into first, second and third substantially extending zones intended respectively for distant vision, intermediate or medium-range vision and near vision; said one surface has a meridian passing through the optical center of the lens, traversing said zones and extending vertically when the lens is mounted in a spectacle frame; said first zone occupies approximately the upper half of said one surface and has a constant curvature providing a constant focal length for distant vision; said third zone occupies a lower portion of said one surface and has a constant curvature providing a constant focal length for near vision; and said second zone has a varying curvature providing a varying focal length, the curvature of said second zone at successive points along said meridian varying progressively from the constant curvature of said first zone to the constant curvature of said third zone. This known lens has a plane of symmetry which is the vertical plane containing the above-mentioned meridian. Since the above-mentioned second zone is not of spherical shape, it has at each point thereof a minimum curvature $C_{min.}$ and a maximum curvature $C_{max.}$ except along said meridian where the minimum and maximum curvatures at each point thereof are of equal value. This results in an astigmatism aberration A at each point of said second zone, the value of which is given by the relation:

$$A = (n-1)(C_{max.} - C_{min.}) \quad (1)$$

where $n$ is the refractive index of the refractive material of the lens. The value of the astigmatism aberration increases in the direction away from said meridian where said value is zero since $C_{max.}$ and $C_{min.}$ at each point thereof are of equal value. On either side of said meridian said second zone presents isoaberration curves, i.e. loci of points of equal value of the astigmatism aberrations. [Due to the above relation (1) between the astigmatism aberration and the maximum and minimum curvatures, these isoaberration curves may be also designated as loci of points of equal value of the difference $(C_{max.} - C_{min.})$]. Assuming that 0.3 D is a limit for the astigmatism aberration tolerated by the human eye, it can be seen that the useful portion of said second zone which can be considered as being substantially free of astigmatism aberrations is bounded laterally by the 0.3 astigmatism isoaberration curves on either side of said meridian.

On the other hand, it is known that when changing from viewing a remote object to viewing a nearby object the lines of sight of a wearer converge. In other words, each line of sight of the wearer traces on the associated lens in going from distant vision to near vision an angled path which is inclined downwardly from the temporal side of the lens to the nasal side of the lens. Therefore, to obtain satisfactory, effortless viewing of nearby objects, the above-mentioned useful portion of the second zone of the above described known lens must be inclined correspondingly. To this end, it has already been proposed to mount both such known ophthalmic lenses in a spectacle frame with their respective above-mentioned meridian inclined downwardly from the temporal side toward the nasal side of the associated lens along the angled path traced thereon by the line of sight of the wearer ingoing from distant vision to near vision. However such method of inclining the meridian results in an unconfortable vision in distant and medium-range lateral binocular vision, as it will be explained in more details hereinunder.

It is therefore the object of the invention to provide an improved ophthalmic lens with a progressively varying focal length offering a more confortable vision, particularly in distant and medium-range lateral binocular vision.

Another object of the invention is to provide a method of making a lens having the above features.

SUMMARY OF THE INVENTION

Briefly the invention provides an improved ophthalmic lens with varying focal length, said lens being made of refractive material and having two refractive surfaces one of which is divided into first, second and third substantially horizontally extending zones intended respectively for distant vision, intermediate distance vision and near vision, said one surface having an oblique meridian passing through the optical center of the lens and traversing said zones, said meridian being inclined downwardly from the temporal side of the lens toward the nasal side of the lens along an angled path traced by the line of sight of a wearer in going from distant vision to near vision, said first zone occupying approximately the upper half of said one surface and having a substantially constant curvature providing a substantially constant focal length for distant vision, said third zone occupying a lower portion of said one surface and having a substantially constant curvature providing a substantially constant focal length for near vision, and said second zone lying between said first and third zones and having a varying curvature providing a varying focal length, the curvature of said second zone at successive points along said meridian varying progressively from the substantially constant curvature of said first zone to the substantially constant curvature of said third zone, said second zone having at each point thereof a minimum curvature $C_{min.}$ and a maximum curvature $C_{max.}$ except along said meridian where the minimum and maximum curvatures at each point thereof are of equal value, said second zone further having on one side of said meridian a first line which is a loci of points where $C_{min.}$ and $C_{max.}$ satisfy the following relation: $[C_{max.} - C_{min.}] = N$, where $N$ has a given value which satisfies the relation: $N \leq 1/(n-1)$, $n$ being the refractive index of said refractive material, and on the other side of said meridian a second line which is a loci of points where $C_{min.}$ and $C_{max.}$ satisfy the above-mentioned relation, the improvement consisting in that, when the lens is in use, any horizontal line in said second zone intersects successively said first line, said meridian and said second line at respective points of intersection, the point of intersection of said horizontal line with said meridian being substantially equally spaced from the points of intersection of said horizontal line with said first and second lines.

The invention will be better understood from the following description in which reference is made to the accompanying drawings.

DESCRIPTION OF THE PREFERRED EMBODIMENTS

If we consider the path followed in one refractive surface of an ophthalmic lens by the intersection of the sight axis or line of sight with said refractive surface of the lens when the focus of a subject's eye moves from infinity ($\infty$) to a point P spaced about twelve inches from the lens, a curve C is obtained (FIG. 2) which begins at $B_1$ (optical centre of the lens corresponding to distant sight) and ends at $A_1$ (near sight), the symbols $O_1$ and $O_2$ denoting the centres of rotation of the eyes. It is customary to consider $B_1$ as the optical centre of the lens. When the eye follows a point moving from infinity to said near point P, it is obvious that vision through the lens between $B_1$ and $A_1$ will be effortless inasmuch as the above-mentioned aberration-free useful portion of the second zone of a lens having a progressively varying focal length is better centered on each side of said curved path C or, in other words, inasmuch as for every position of the sight axis between $B_1$ and $A_1$ the lateral field of vision is symmetrical with respect to path C. Various methods have been proposed for achieving this result.

Figure 1:
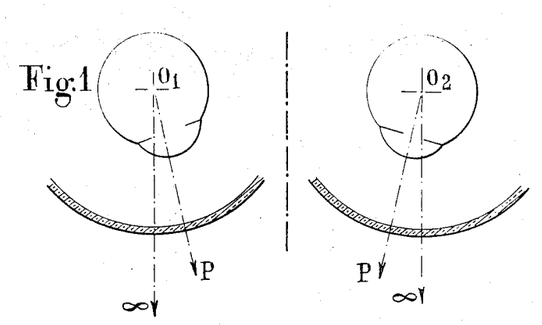
FIG. 1 is a diagrammatic plan view of two eyes each provided with a lens to be used for near, medium-range and distant vision.
Figure 2:
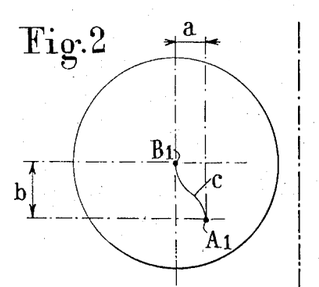
FIG. 2 is a front view of the lens for the left-hand eye of a wearer.
Figure 11:
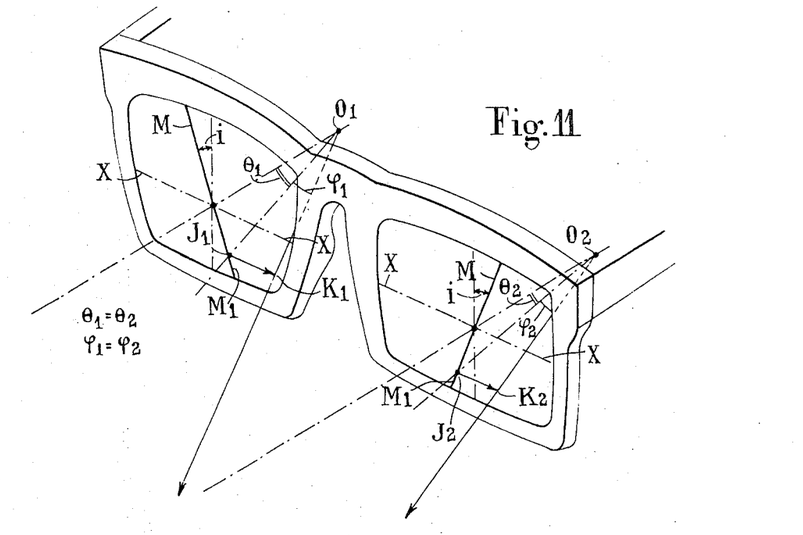
FIG. 11 is a perspective view of spectacles having two ophthalmic lenses of the invention.

Thus, as it has been previously proposed, meridian $MM_1$ along which the focal length progressively varies (FIG. 3) may be downwardly inclined from the temporal side of the lens to the nasal side of said lens by pivoting the latter, when mounting said lens in a spectacle frame, around it centre $B_1$ by an angle $i$ having a tangent $a/b$ wherein $a$ and $b$ designate the horizontal and vertical components, respectively, of the distance between points $A_1$ and $B_1$ (FIG. 2). The value of angle $i$ depends upon the wearer and is usually comprised between 0° and 15° although it appears to have a higher value in FIG. 3 and 4. However this method of pivoting the lens around its center $B_1$ is objectionable in that it causes an astigmatism aberration zone $\alpha$ (FIG. 3) to project above the horizontal line XX passing through $B_1$ on the nasal side of the lens, which is obviously inadequate for lateral distant vision through the nasal side of the lens. Moreover, due to the fact that in previously known ophthalmic lenses with a progressively varying focal length the plane containing meridian $MM_1$ is a plane of symmetry for the lens, the maximum and minimum curvatures $C_{Rmax.}$, $C_{Smax.}$ and $C_{Rmin.}$, $C_{Smin.}$ at any pair of points R and S in the intermediate vision zone which are so located on either side of meridian $MM_1$ that segment RS is perpendicularly bisected by meridian $MM_1$, have identical values respectively ($C_{Rmax.} = C_{Smax.}$ and $C_{Rmin.} = C_{Smin.}$), whereas the maximum and minimum curvatures $C_{Tmax.}$, $C_{Smax.}$ and $C_{Tmin.}$, $C_{Smin.}$ at any pair of points T and S which are so located on a same horizontal line on either side of meridian $MM_1$ that segment TS is obliquely bisected by meridian $MM_1$, have different values respectively ($C_{Tmax} \neq C_{Smax.}$ and $C_{Tmin.} \neq C_{Smin.}$). Therefore the astigmatism aberrations at any pair of points such as points T and S, which can be calculated by the above-mentioned relation (1), have different values, thereby resulting in an asymmetrical lateral field of vision. Furthermore, if it is assumed that the spectacles of the wearer comprise two identical known ophthalmic lenses with progressively varying focal length, one of which has its meridian $MM_1$ pivoted clockwise by an angle $a$, while the other hand its meridian $MM_1$ pivoted counterclockwise by the same angle $i$ as shown in FIG. 11, it can be seen that in lateral binocular vision through the respective intermediate vision zones of these two lenses the lines of sight intersects said lenses at points $K_1$ and $K_2$, respectively, which, although they are equally spaced in the horizontal direction from the respective meridians $MM_1$ ($J_1K_1=J_2K_2$), have astigmatism aberrations of different values, thereby resulting in an incomfortable vision.

The object of the invention is to eliminate these drawbacks. This object is attained by an ophthalmic lens having a progressively varying focal length and a meridian $MM_1$ inclined to the vertical downwardly from the temporal side of the lens to the nasal side of said lens along an angled path traced by the line of sight of a wearer in going from distant vision to near vision as in previously known ophthalmic lenses with a progressively varying focal length, but having a distribution of the astigmatism aberrations as that shown in FIG. 4. In this FIG. 4, which shows a lens for the left-hand eye of a wearer, curves E and F which are illustrated as limiting the hatched areas and which are, for instance, 1 Diopter isoastigmatism curves (i.e. loci of points where the astigmatism aberration is equal to 1 diopter), are so located on either side of meridian $MM_1$, that every horizontal segment such as segments $GG_1$, $HH_1$ and $LL_1$ connecting a point G, H or L of curve E to a point $G_1$, $H_1$ or $L_1$ of curve F is obliquely bissected by meridian $MM_1$. Since astigmatism aberration at a point of a refractive surface of a lens is related to the maximum and minimum curvatures at said point of said refractive surface according to the above-mentioned relation (1), these 1 Diopter isoastigmatism curves E and F can be considered as loci of points where the difference between the maximum and minimum curvatures of the refractive surface of the lens of the invention is equal to $1/(n-1)$, $n$ being the refractive index of the material of which the lens is made.

Figure 3:
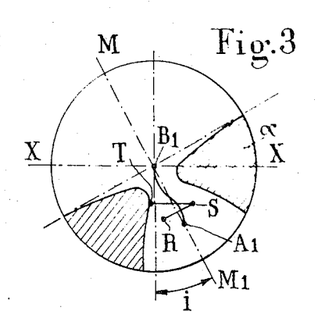
FIG. 3 shows diagrammatically the distribution of the astigmatism aberrations in a lens of the prior art for the left-hand eye, said lens having a progressively varying focal length and a meridian which is inclined to the vertical and along which the focal length progressively varies.
Figures 4, 5:
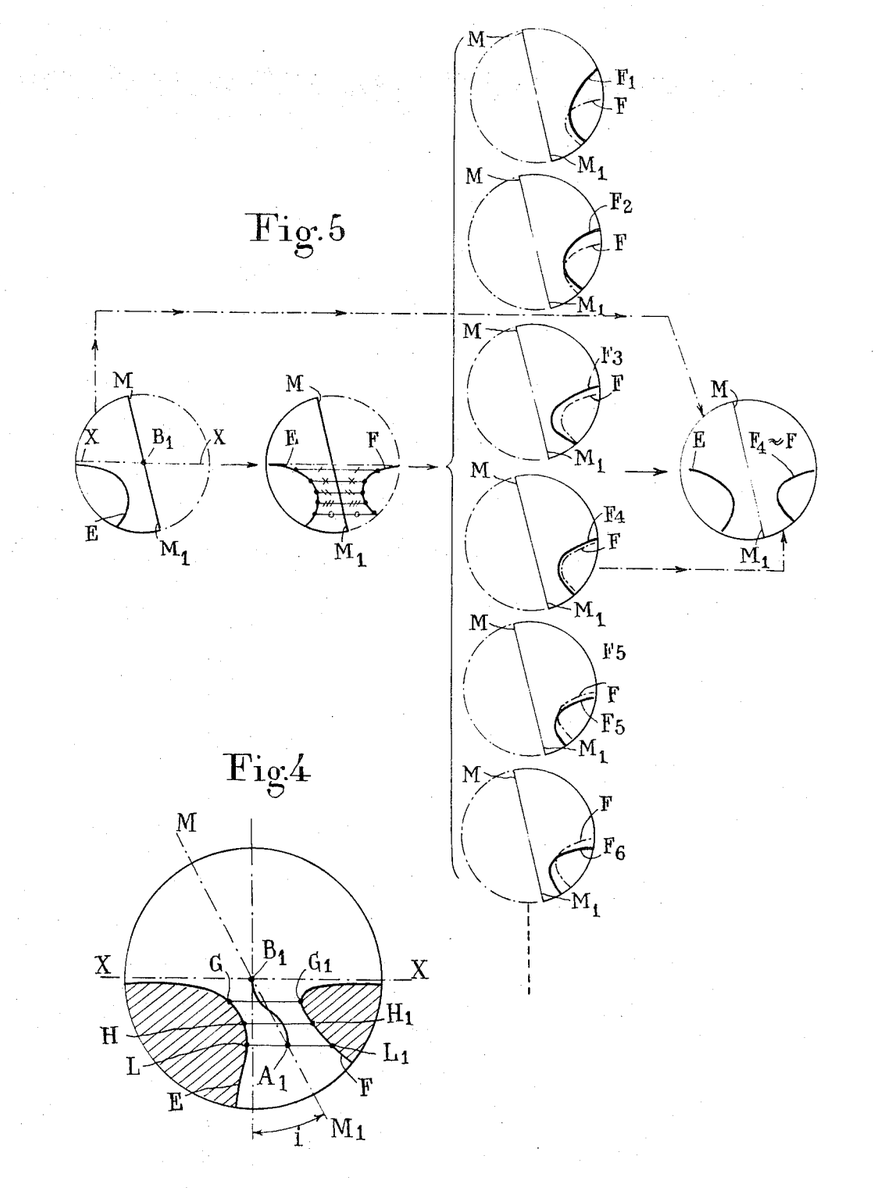
FIG. 4 shows diagrammatically the distribution of the astigmatism aberrations in a lens for the left-hand eye according to one embodiment of the invention.
FIG. 5 illustrates successive steps of the method of determining one of the two refractive surfaces of a lens in accordance with the invention.

Before describing a method of making an ophthalmic lens of the invention having astigmatism aberrations distributed as shown in FIG. 4, description will first be given of the method of making a known ophthalmic lens such as that above-described and illustrated in FIG. 3.

The applicant's U.S. Pat. Nos. 2,869,422 and 2,915,856 recite and provide means for generating an optical surface having a plane of symmetry and having a focal length which progressively varies along its meridian in the plane of symmetry of the surface. By resorting to a simple geometrical calculation, one can obtain the coordinates of any point of this surface in a given reference system; thus, notably, one can locate this point by its distance to a sphere counted on the radius of said sphere which will be selected to be preferably tangent to the vertex ($B_1$) of the surface. Thus the surface can be determined from a table of figures denoting the discrepancies in relation to the reference sphere of as many points as desired. These points will advantageously be selected to be spaced from one another by small, constant angles, so as to provide a regular pattern or raster permitting the useful extrapolations according to known mathematic techniques.

Thus, the first surfaces utilized under commercial conditions by the applicant were symmetrical in relation to the plane of the meridian $MM_1$ as shown in FIG. 3, and characterized by a discrepancy table obtained as follows:

Firstly, a law of progression of the focal length along meridian $MM_1$ and therefore a corresponding law of progression of the curvature at successive points along meridian $MM_1$ was selected; this law, in the case of the surface of FIG. 3, was as follows:

constant curvature from M to $B_1$
progressively varying curvature from $B_1$ to $A_1$
constant curvature from $A_1$ to $M_1$ It is well known that an infinity of surfaces can bear on a given curve, i.e. in the present case on meridian $MM_1$. Therefore, when computing with the aid of a computer the discrepancies and curvatures at a great number of points of the surfaces bearing on meridian $MM_1$, an additional requirement can be set for these surfaces. This requirement may be, for instance, that the upper half surface portion located above the meridian perpendicular to meridian $MM_1$ and the lower surface portion, between $A_1$ and $M_1$, be of substantially spherical shape with curvatures substantially equal to said constant curvature from M to $B_1$ and to said constant curvature from $A_1$ to $M_1$, respectively, thus providing directly the corresponding values of the discrepancy table.

Along portion $A_1B_1$ of meridian $MM_1$ the radius $R_c$ of said portion $A_1B_1$ has a value which progressively varies from the value of the radius of the upper substantially spherical surface portion to the value of the radius of the lower substantially spherical surface portion, and the surface is so designed that, at each point along the meridian $MM_1$, it admits $R_c$ as the value of its two main radii of curvature ($R_{min.}$ and $R_{max.}$). In other words, this surface is umbilical along the meridian, i.e. at each point along meridian $MM_1$ the main radii of curvature ($R_{min.}$ and $R_{max.}$) are of equal value. To determine the surface completely, at each point of portion $A_1 B_1$ of meridian $MM_1$, this surface is cut across its second main plane, of course at right angles to the plane containing the meridian $MM_1$, and the intersection is selected to be the curve admitting on the one hand the circle having a radius $R_c$ as an osculating circle and permitting on the other hand by means of conventional geometrical optical calculations performed by degrees or step by step of confining the detrimental astigmatism aberrations as far as possible from the meridian $MM_1$. Assuming for instance that 0.3 diopter is a permissible limit for the astigmatism aberration, the values of the discrepancy are easily calculated in the useful portion between the two 0.3 diopter isoastigmatism curves which are illustrated as limiting the hatched areas of FIG. 3.

Outside these isoastigmatism curves the surface is optically useless, since the geometrical deformations are abnormally great. The surface is determined with a view on the one hand to continuity the continuisty of the surface and on the other hand to avoid presenting too pronounced peripheral images to the eye. Thus, the distribution of the spherical zones selected for making the first optical surfaces made on a commercial scale by the Applicant provided sufficiently smooth transition zones to avoid any effect likely to cause discomfort to the wearer.

If the area of the upper substantially spherical surface portion for distant vision were reduced, the area of the lateral transistion zones between the upper and lower spherical surface portions would be increased and the peripheral effects or aberrations would be further reduced.

If in contrast thereto the area of the upper substantially spherical surface portion were increased, the area of said lateral transition zones would be reduced and the deformations would become considerable but concentrated in a small area.

Thus, the discrepancy table is easily determined and permits the defining completely the surface and can be embodied according to the means described in the above-mentioned applicant's U.S. patents, as follows: a steel alloy model is prepared as described in the U.S. Pat. No. 2,982,058. It is reproduced either directly on a block of refringment material or on a block of material adapted to constitute a mold for producing a lens either by hot carrier deformation of a glass block or by casting a polymerizable resin by means of the machine described and illustrated in the U.S. Pat. No. 3,041,789 which forms a geometrically precise surface at each point referenced on the discrepancy table, the number of these points being as great as desired and generally in excess of 2,000 for a surface of known diameter. The machine described and illustrated in the U.S. Pat. No. 3,021,647 permits the honing this surface, i.e. making it perfectly continuous without appreciably modifying its geometrical characteristics. This surface is subsequently polished on a flexible polishing machine with the usual cares.

Having thus described the method of obtaining such a refractive surface of a known ophthalmic lens with a progressively varying focal length, description will now be given of the method of obtaining a refractive surface of an ophthalmic lens of the invention.

Firstly, as previously, a law of progression of the focal length along meridian $MM_1$ and, therefore, a corresponding law of progression of the curvature at successive points along meridian $MM_1$ is selected as follows:

constant curvature from M to $B_1$
progressively varying curvature from $B_1$ to $A_1$
constant curvature from $A_1$ to $M_1$ Having thus set this progression lens, the meridian profile and then the radius of curvature at each point thereof were determined.

Figure 6:
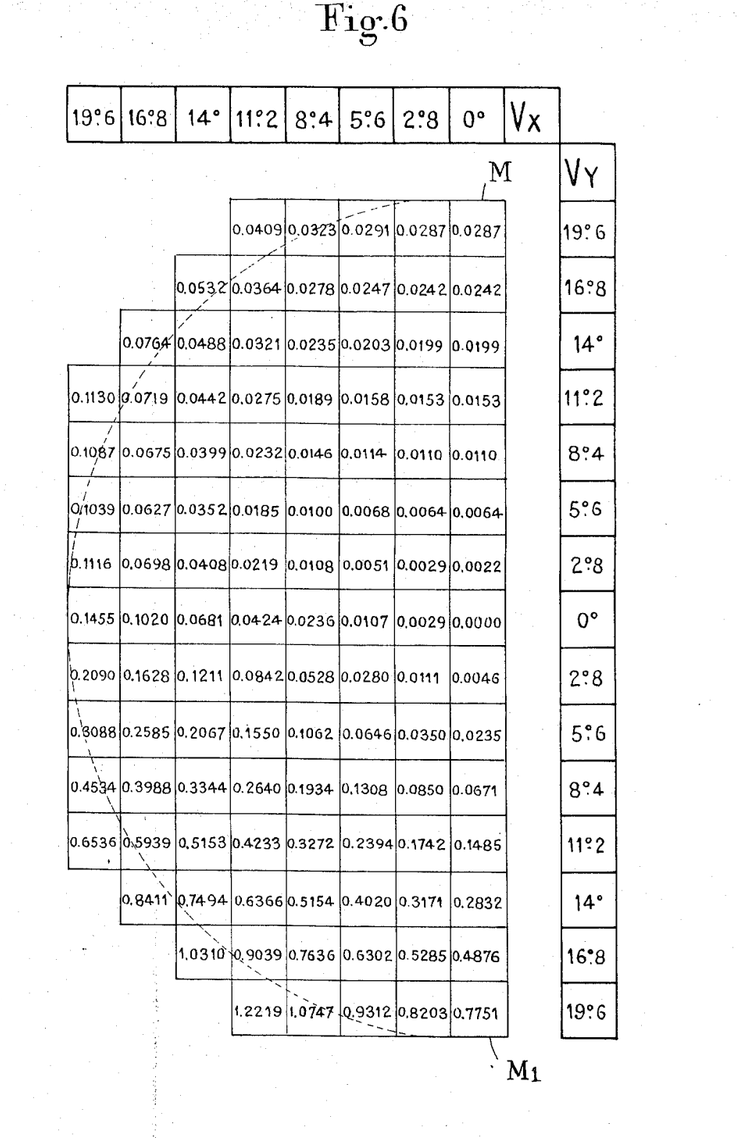
FIG. 6 is a table giving the discrepancies with respect to a reference sphere, of a number of points of that half of said one surface which is located on the temporal side of the lens and is limited to the oblique or angled meridian.
Figure 7:
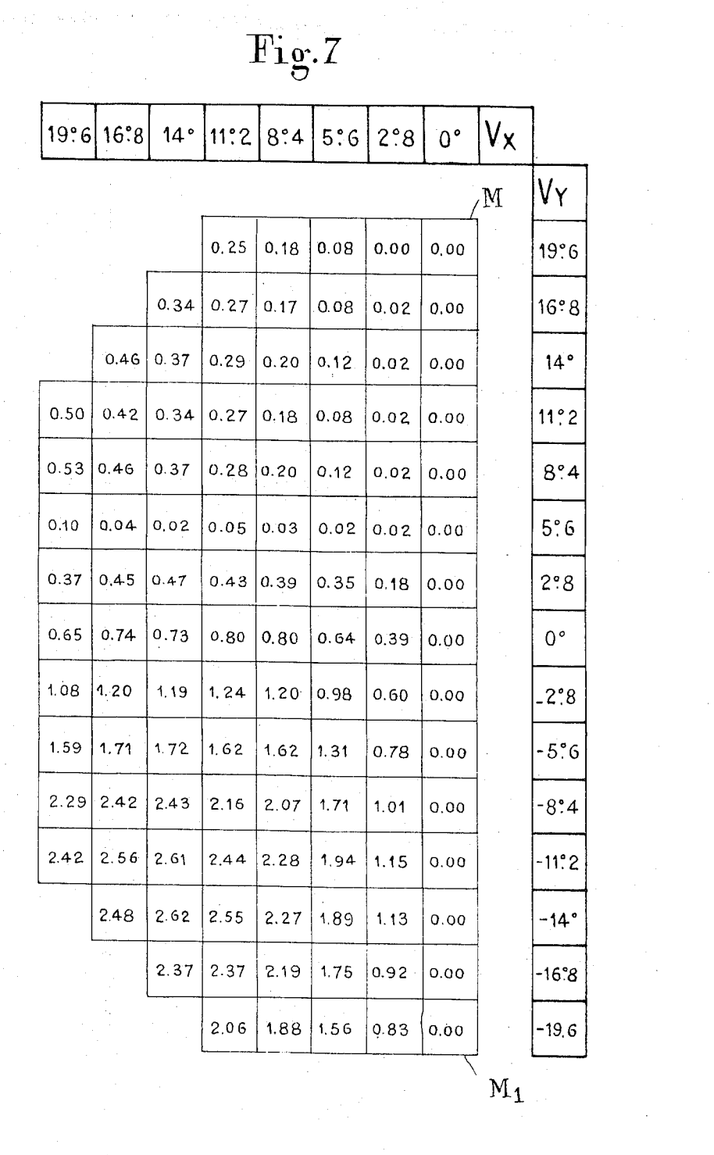
FIG. 7 is a table similar to table of FIG. 6, giving the respective values of the astigmatism aberration at said number of points.
Figure 8:
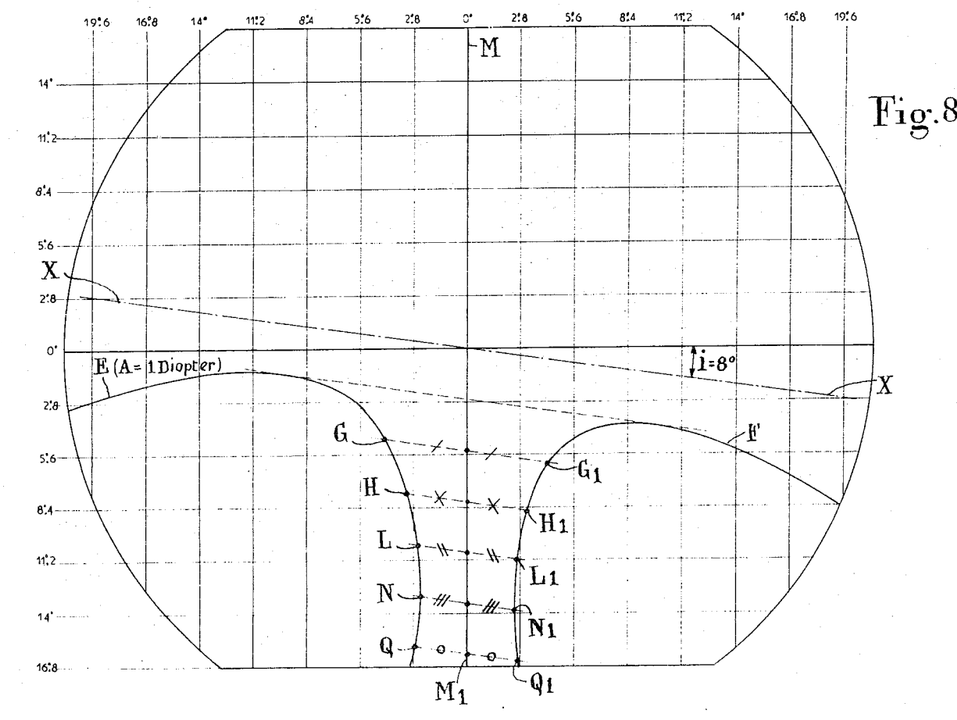
FIG. 8 is a view illustrating the step of determining by geometrical construction the shape and position of an ideal 1 D isoastigmatism curve in the second half of said one surface, which is located on the nasal side of the lens and is limited to the oblique or angled meridian.

Then, as shown in FIG. 5, a first half of the refractive surface bearing on meridian $MM_1$, for instance the half thereof located on the temporal side of the lens, is determined according to a similar way as previously known surfaces. That is, when computing this temporal half surface bearing on meridian $MM_1$, one takes into account the fact that the two main curvatures ($C_{max.}$ and $C_{min.}$) of this temporal half surface at each point along meridian $MM_1$ must be of equal value. However, contrary to the previously known surfaces, the present temporal half surface is no longer so computed that its upper half portion located above the meridian which is perpendicular to meridian $MM_1$ at $B_1$ be of substantially spherical shape, but merely the portion thereof which is located above the horizontal meridian XX passing through $B_1$ (the lens being considered in its position of use). The computer used for so determining said temporal half surface is not only programmed with a view to provide the discrepancies with respect to a reference sphere at a great number of points of said temporal half surface, but also to provide the maximum and minimum curvatures at each one of said great number of points and also the value of the astigmatism aberration at each one of said great number of points. Therefore, it is an easy matter to draw the map of the astigmatism aberrations of said temporal half surface, i.e. the isoastigmatism curves or the various loci of points where the astigmatism aberration have given values, respectively. FIG. 6 gives, by way of example, the discrepancies in mm with respect to a reference sphere having a radius of 82.02 mm at several points of the temporal half surface of a lens having a power addition of 1.50 diopters and having a meridian $MM_1$ which makes an angle $i$ of 8°. FIG. 7 gives, by way of example, the values in diopters of the astigmatism aberrations at points of the temporal half surface corresponding respectively to these of table of FIG. 6. Table of FIG. 7 gives also, save on a factor $1/(n-1)$, the value of the difference ($C_{max.}-C_{min.}$) at each point of the table. FIG. 8 shows in the left-hand part thereof, the 1 diopter isoastigmatism curve E of the temporal half surface of this example, and, as shown, this curve E is entirely located under meridian XX which, in use, extends horizontally.

Then, as illustrated by FIGS. 5 and 8, the next step of the method of making the surface of the invention consists in determining the ideal 1 diopter isoastigmatism curve F for the second or nasal half of the surface bearing on meridian $MM_1$. This curve F is so drawn, that any horizontal segment, such as $GG_1$, $HH_1$, $LL_1$, $NN_1$, $QQ_1$, ...., parallel to the horizontal meridian XX and connecting points G, H, L, N, Q, ... of curve E to points $G_1$, $H_1$, $L_1$, $N_1$, $Q_1$, ...., respectively, of curve F is obliquely bissected by meridian $MM_1$.

Figure 9:
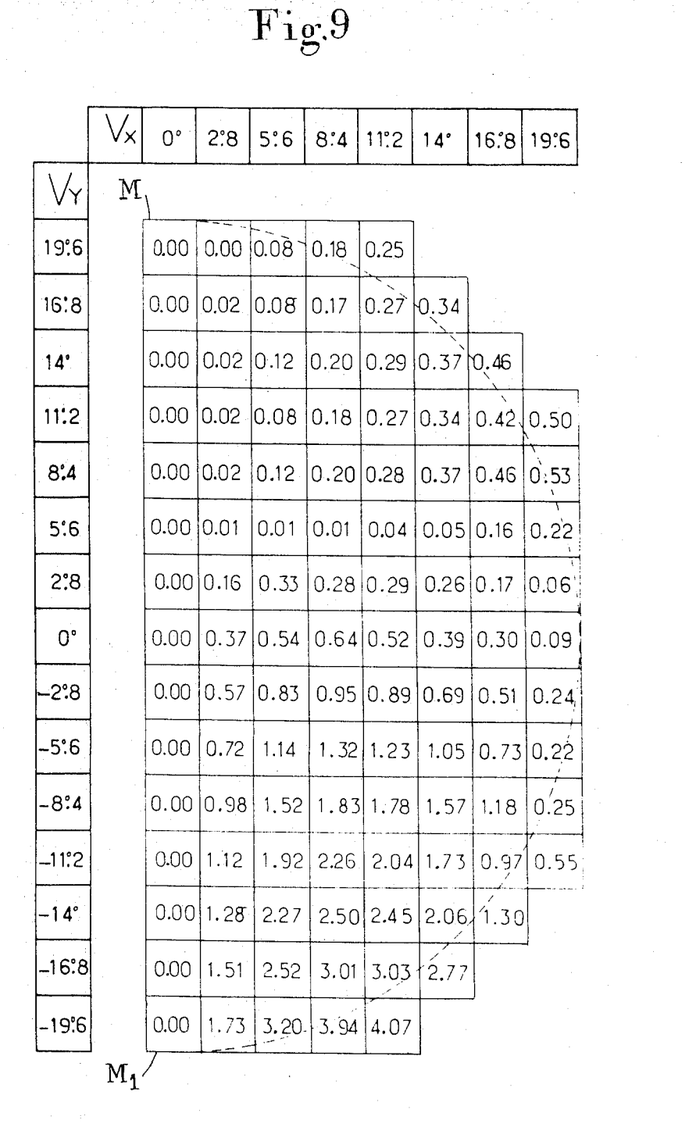
FIGS. 9 and 10 are tables similar to tables 7 and 6, respectively, giving the discrepancies and values of the astigmatism aberration at a number of points of said second half of said one surface.
Figure 10:
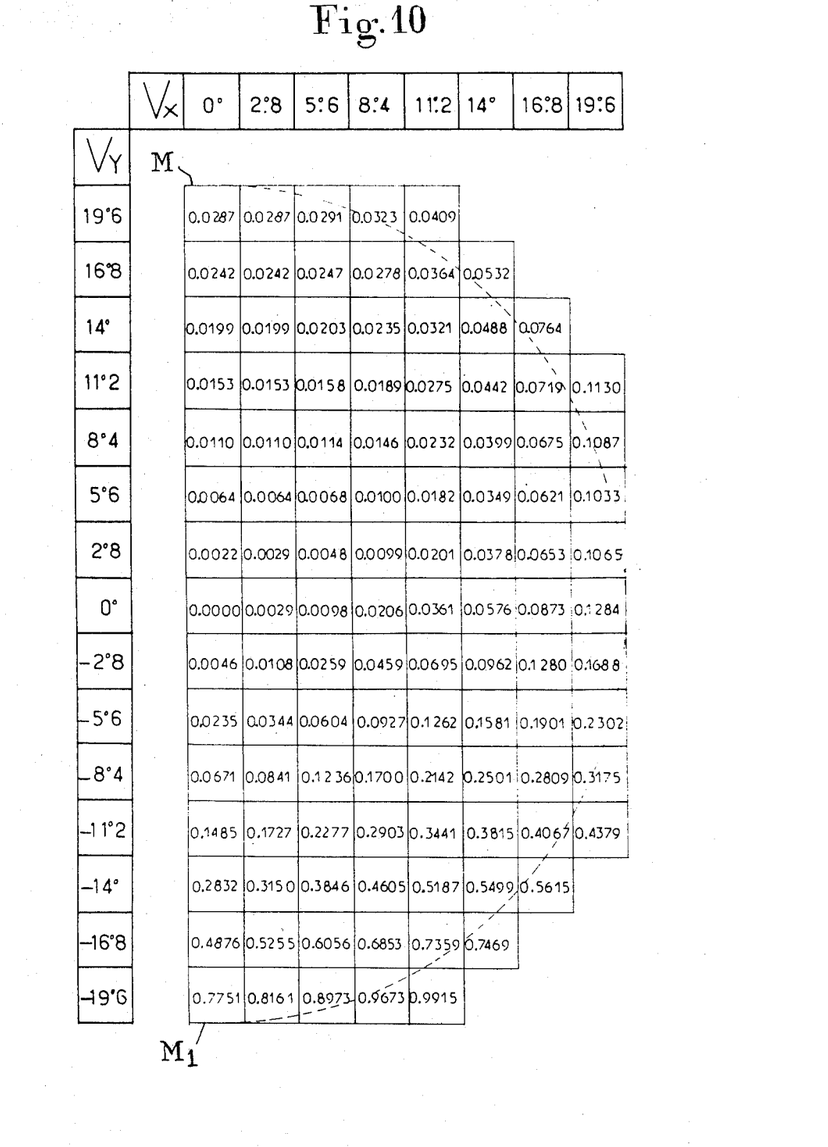

Having thus determined the ideal isoastigmatism curve for the nasal half surface, a plurality of nasal half surfaces bearing on the same meridian $MM_1$ as the temporal half surface are then determined with the aid of a computer in a way similar to that used for the determination of the temporal half surface. To each one of said nasal half surfaces correspond a discrepancy table and a table or map of the astigmatism aberrations. From this table of the astigmatism aberrations, the actual 1 diopter isoastigmatism curve $F_1$, $F_2$, $F_3$, $F_4$ ..... .. of each of said nasal half surface is drawn and compared to the ideal one F. This step is illustrated in FIG. 5 which shows six nasal half surfaces with their 1 diopter isoastigmatism curve $F_1$ to $F_6$. Of course, the number of nasal half surfaces so computed is not limited to six, but may it be any other number; the greater this number is, the greater the chances are to find among curves $F_1-F_6$ .... thus obtained one which approximates the best in shape and position ideal curve F. As shown in FIG. 5, it is the fourth nasal half surface from the top of this figure which has a curve $F_4$ which approximates the best in shape and position the ideal curve F. Therefore, it is this nasal half surface and the discrepancy table associated thereto which will be retained for making the surface bearing on meridian $MM_1$ of the lens of the invention. FIG. 10 and 9 give the table of discrepancies in mm and the table of the astigmatism aberrations in diopters, respectively, at several points of the retained nasal half surface in the case of the lens of the choosen example (Addition 1.50 diopters, $i=8°$). Although the tables of FIGS. 6, 7, 9 and 10 concern a relatively small number of points of the surface, the tables used actually for making such a surface concern a greater number of points, generally in excess of 2,000 for a surface of given diameter. The lens of the invention is thus completely determined and it can be ground and polished as above described with reference to previously known lenses. Alternatvely a mold can be made for casting therein or thermally weighting down onto said mold a transparent polymerizable or thermoplastic resin.

In the above-described method of making the surface of the lens of the invention which bears on the angle meridian $MM_1$, the temporal half of this surface was first determined and then the nasal half thereof. Of course, by using a similar process, this surface could be obtained by determining firstly its nasal half and then its temporal half.

In the foregoing and in FIG. 5 to 10, it has been described more particularly a method of making one of the two surfaces of a lens of the invention for a left-hand eye of a wearer, but it is obvious that a similar process can be adhered to for making the corresponding surface of a lens for the right-hand eye.

As described above, the surfaces obtained by using such a method comprise 1 diopter isoastigmatism curves E and F which do not extend above the horizontal meridian XX when the lens is in use, and also which are so located on either side of meridian $MM_1$ that any horizontal segment connecting a point of curve E to a point of curve F is obliquely bissected or substantially bissected by meridian $MM_1$. In other words, any horizontal line intersects successively curve E, meridian $MM_1$ and curve F at respective points of intersection which are such that the point of intersection of said horizontal line with meridian $MM_1$ is substantially equally spaced from the two other points of intersection of said horizontal line with curves E and F, respectively. When drawing the other isoaberration curves of the surface thus obtained, that is the curves along which the astigmatism aberrations are constant and have given values, respectively, for instance 0.1 diopter, 0.2 diopter, 0.3 diopter, . . . , 1 diopter (already drawn), . . . 1.5 diopter, . . . . . , it can be seen that a similar oblique symmetry relationship is also true for each pair of isoastigmatism curves along which the astigmatism aberrations are of equal value, provided that these pairs of isoastigmatism curves are located in the area between the two 1 diopter isoastigmatism curves E and F. This is particularly true for the two 0.3 isoastigmatism curves. Outside these curves E and F the isoastigmatism curves which corresponds to astigmatism values higher than 1 diopter show less and less by pair the above oblique symmetry relationship as they are more and more distant from meridian $MM_1$, but this is of no importance since in those parts of the surface (outside curves E and F) the lens is useless.

Although in the foregoing, the isoastigmatism curves E and F used to determine the second or nasal half of the surface bearing on meridian $MM_1$ are the 1 diopter isoastigmatism curves of the surface, one could also use isoastigmatism curves along which the astigmatism aberration has another given value, preferably at least equal to 0.3 diopter, for instance, 0.5, 1.5 or even 2 diopters.

Although in the foregoing, it has been said, for sake of simplification, that point $B_1$ where the focal length begins to increase along meridian $MM_1$ in going toward point $A_1$ is usually located at the optical center of the lens, this point $B_1$ could have any other position on meridian $MM_1$ in the vicinity of the optical center of the lens. Under such circumstances, when determining the temporal half surface, the horizontal line to consider above which curve E must not extend is no longer the horizontal meridian XX passing through the optical center of the lens, but the horizontal line intersecting meridian $MM_1$ at $B_1$. Actually, in the above example illustrated by tables of FIG. 6, 7, 9 and 10, the coordinates of point $B_1$ are $V_x=0°$ and $V_y=+5.6°$, and those of point $A_1$ are $V_x=0°$ and $V_y=-9.8°$.

The advantages resulting from the use of a lens one of the two refractive surfaces of which is composed of a surface made as described hereinabove will be readily apparent. They can be summarised as follows:

the lateral field of vision is preserved both under distant sight conditions and in near sight conditions;

in the intermediate range of vision, the field is limited by isoastigmatism curves which are in an oblique symmetry relationship with respect to meridian $MM_1$, thereby preserving comfort of vision;

in binocular lateral vision, the two lines of sight of the wearer intersects the lenses at points, for instance points $K_1$ and $K_2$ in FIG. 11, where the astigmatism aberrations are of equal value. This is obvious from FIG. 11 if it is assumed that the progression law along the respective meridians $MM_1$ of the two lenses are identical, and bearing in mind that both lenses show an oblique symmetry with respect to their respective angled meridians $MM_1$;

the general method for applying the principle of this invention is applicable to the unground lenses, or block of refractive material, or to the construction of a mold for manufacturing lenses of thermoplastic or thermosetting resin.

What I claim is:

1. An improved ophthalmic lens with varying focal length, said lens being made of a refractive material and having two refractive surfaces one of which is divided into first, second and third substantially horizontally extending zones intended respectively for distant vision, intermediate distance vision and near vision, said one surface having an oblique meridian passing through the optical center of the lens and traversing said zones, said meridian being inclined downwardly from the temporal side of the lens toward the nasal side of the lens along an angled path traced by the line of sight of a wearer in going from distant vision to near vision, said first zone occupying approximatively the upper half of said one surface and having a substantially constant curvature providing a substantially constant focal length for distant vision, said third zone occupying a lower portion of said one surface and having a substantially constant curvature providing a substantially constant focal length for near vision, and said second zone lying between said first and third zones and having a varying curvature providing a varying focal length, the curvature of said second zone at successive points along said meridian varying progressively from the substantially constant curvature of said first zone to the substantially constant curvature of said third zone, said second zone having at each point thereof a minimum curvature $C_{min.}$ and a maximum curvature $C_{max.}$ except along said meridian where the minimum and maximum curvatures at each point thereof are of equal value, said second zone further having on one side of said meridian a first family of curves which have their convexity directed towards said meridian and which are loci of points where $C_{min.}$ and $C_{max.}$ satisfy the following relation: $(C_{max.}-C_{min.})=N$, where $N$ is a constant having a different value for each curve of said first family and the larger this constant value, the larger the spacing of the corresponding curve of said first family in relation to the meridian, and on the other side of said meridian a second family of curves which have their convexity directed towards said meridian and which are loci of points where $C_{min.}$ and $C_{max.}$ satisfy the above-mentioned relation with N also having a different value for each curve of said second family and the larger this value, the larger the spacing of the corresponding curve of said second family in relation to the meridian, the improvement consisting in that, for a predetermined fixed value of N selected in making the lens in the range of $0.3/(n-1)$ to $1/(n-1)$, $n$ being the refractive index of said refractive maerial, to which correspond a first curve of said first family and a second curve of said second family, and when the lens is in use, any horizontal line in said second zone intersects successively said first curve, said meridian and said second curve at respective points of intersection, the point of intersection of said horizontal line with said meridian being substantially equally spaced from the points of intersection of said horizontal line with said first and second curves.

2. An ophthalmic lens as set forth in claim 1, wherein for any pair of curves pertaining the one to said first family and the other to said second family and corresponding both to a same value of N smaller than the predetermined selected value of N, any horizontal segment joining the two curves of said pair is obliquely bisected by said meridian.

* * * * *